United States Patent [19]
Miller et al.

[11] 3,767,467
[45] Oct. 23, 1973

[54] BATTERY SIDE TERMINAL ASSEMBLY

[75] Inventors: James H. Miller; Duane D. Hakarine, both of Minneapolis, Minn.

[73] Assignee: Gould Inc., Mendota Heights, Minn.

[22] Filed: Dec. 20, 1971

[21] Appl. No.: 210,079

[52] U.S. Cl. ............................................. 136/135
[51] Int. Cl. ............................................. H01m 5/00
[58] Field of Search ...................... 136/134, 135, 168

[56] References Cited
UNITED STATES PATENTS
2,076,341  4/1937  Henry ................................. 136/168
3,113,892  12/1963  Albrecht ............................. 136/168
3,607,441  9/1971  Mix ..................................... 136/168

Primary Examiner—A. B. Curtis
Assistant Examiner—H. A. Feeley
Attorney—C. Frederick Leydig et al.

[57] ABSTRACT

A battery side terminal assembly in which a metal terminal passes through the battery container wall and has a head portion shielded by a ring molded on the wall, with the head portion also being locked against rotation by interengaging lugs and sealed against liquid leakage by a gasket.

3 Claims, 5 Drawing Figures

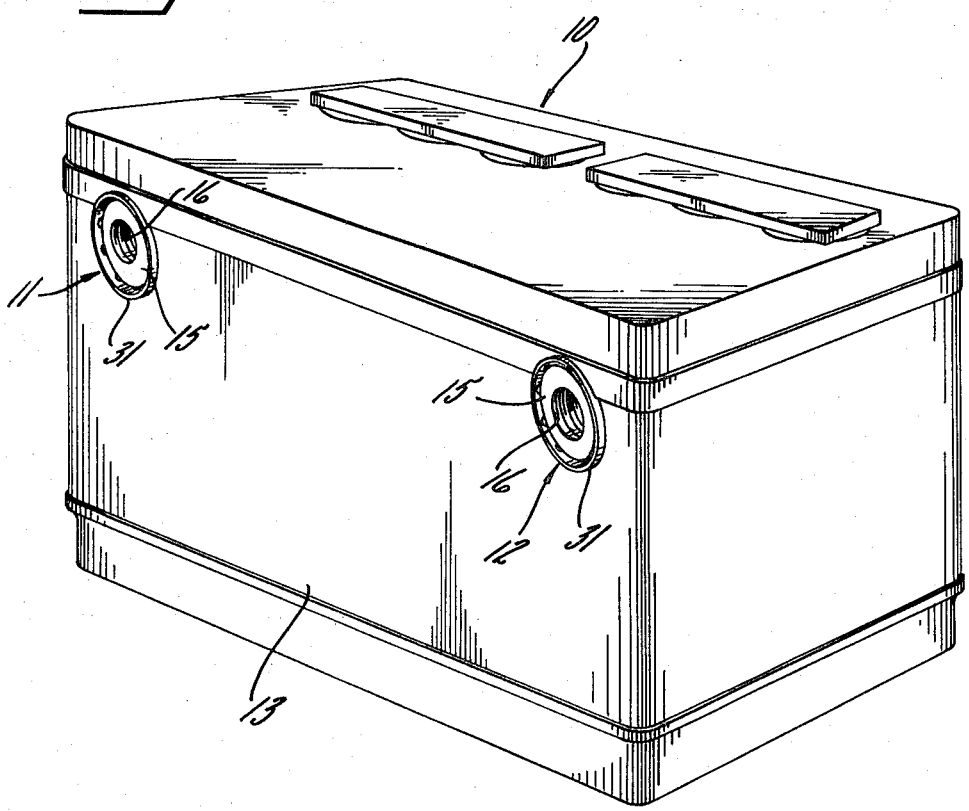
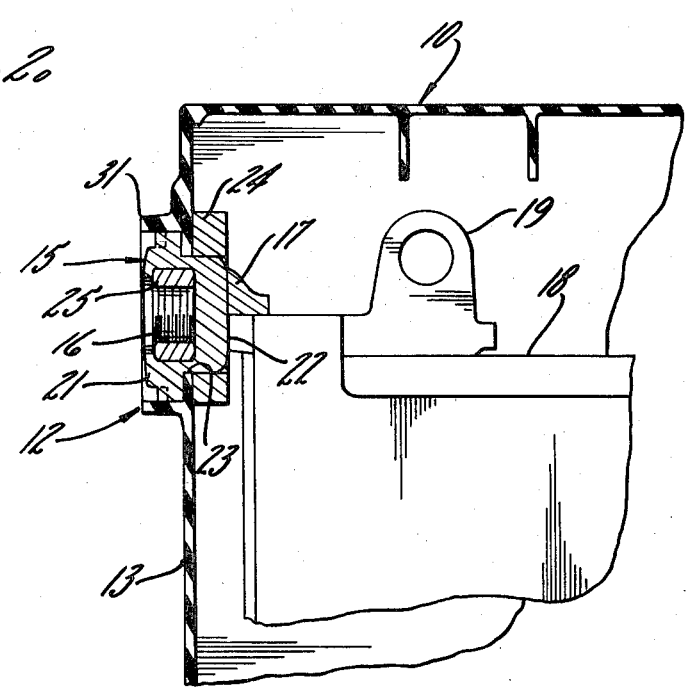

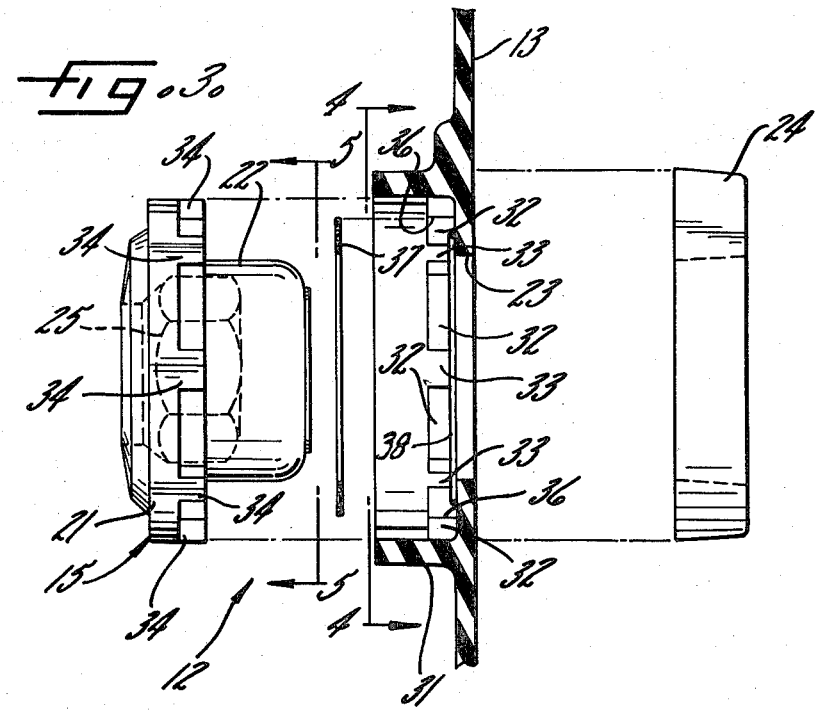
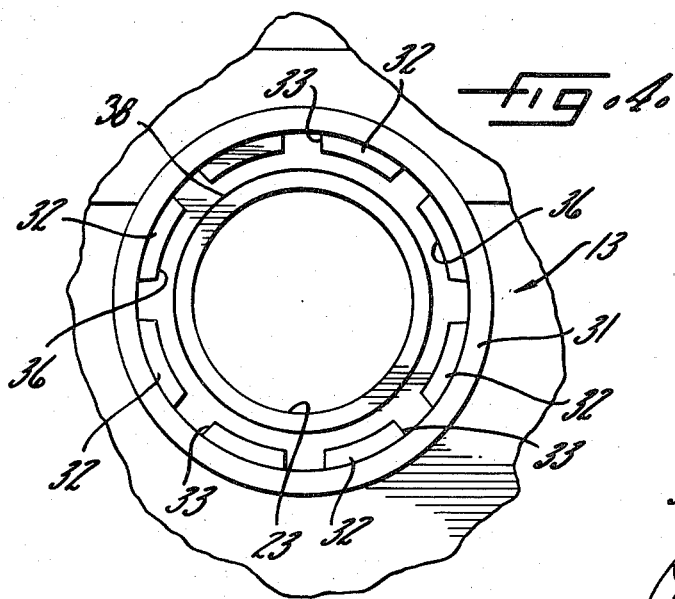
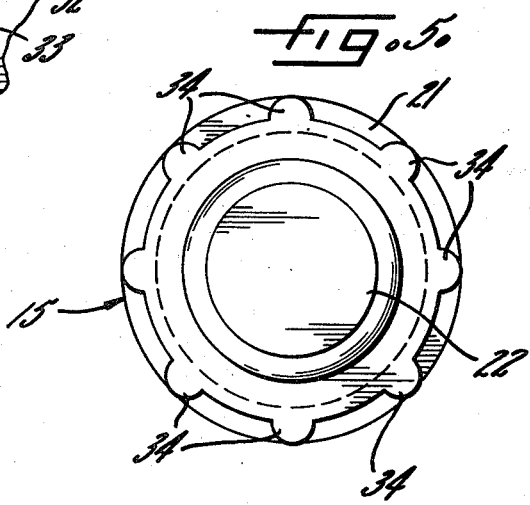

BATTERY SIDE TERMINAL ASSEMBLY

DESCRIPTION OF THE INVENTION

This invention relates generally to electric storage batteries and more particularly concerns a side terminal assembly for such batteries.

As a step toward producing more reliable automotive type batteries requiring little or no maintenance, it has been proposed to locate the battery electrical terminals on the side of the container so that they are less exposed to mechanical or corrosive damage. Such terminals are often also provided with female threads to facilitate making an electrically good, vibration-resistant connection with a male threaded member on the battery lead.

Since a side terminal is located below the electrolyte level in the battery, sealing against liquid leakage is critically important. Also, a threaded side terminal must be quite torque resistant to prevent anticipated handling, and mishandling, from breaking the seal or even the electrical connection to the battery plates. These problems are magnified by the need for minimizing the size of the terminal assembly, and the increasingly prevalent use of materials for the container allowing the container walls to be relatively thin and flexible.

Accordingly, it is the primary aim of the invention to provide an improved battery side terminal assembly which is leak-proof and quite torque resistant. A collateral object of the invention is to provide a terminal assembly of the foregoing type which remains effective through wide temperature ranges and under severe vibration.

It is also an object to provide a terminal assembly of the above type which is compact and yet well protected against accidental damage during shipment, installation and use of the battery.

Another object is to provide a terminal assembly as characterized above which is well suited to economical, high volume production, i.e., which functions properly even though there are some variations in part size, surface finish and degree of care in assembly.

Other objects and advantages of the invention will become apparent upon reading the following detailed description and upon reference to the drawings, in which:

FIG. 1 is a perspective of a battery embodying terminal assemblies of the invention;

FIG. 2 is an enlarged fragmentary section through one of the terminal assemblies shown in FIG. 1;

FIG. 3 is an enlarged partial section of the assembly shown in FIG. 2;

FIG. 4 is an elevation taken approximately along the line 4—4 in FIG. 3; and

FIG. 5 is an elevation taken approximately along the line 5—5 in FIG. 3.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning now to FIG. 1, there is shown a battery 10 having side terminal assemblies 11 and 12 constituting the electrical connections of the battery and embodying the invention. The illustrative battery 10 is generally rectangular with the assemblies 11, 12, which are structurally the same, being located at opposite ends of one long side wall 13. Preferably, the side wall 13, as well as the rest of the battery container, is molded of material having physical characteristics allowing a relatively thin cross section to meet the applicable standards for a battery container.

When assembled, each terminal assembly 11, 12 provides a terminal 15 formed of metal, preferably lead, having internal threads 16 and being electrically connected by a lug 17 to plate structure 18 within the adjacent battery cell and the ends of the battery. The plate structures in adjoining cells are interconnected, in the illustrated case by intercell connection assemblies 19, so that the two terminal assemblies 11, 12 are joined by an internal circuit running through the battery 10.

In carrying out the invention, the terminal 15 of each assembly is formed with a head portion 21 on the outside of the side wall 13 and a body portion 22 fitted within an opening 23 in the wall 13 which is joined, as by fusing, with a metal ring 24 on the inside of the side wall. The internal threads 16 are defined by a nut member 25 embedded in the head portion 21 of the terminal 15, with the member 25 being formed of harder metal than the relatively soft lead of the terminal.

Pursuant to the invention, a continuous barrier ring 31 is molded integrally with the wall 13 to project outwardly around the opening 23, a plurality of ribs 32 are molded integrally with both the wall 13 and the ring 31 to both stiffen the ring and define, between the ribs 32, locking notches 33, and a plurality of lugs 34 are formed around the periphery of the terminal head portion 21 to fit within the notches 33. When assembled, the terminal head portion 21 is recessed within and shielded by the barrier ring 31, the lugs 34 and notches 33 interfit and lock the terminal 15 against rotation, and the fused metal ring 24 rightly secures the terminal to the side wall 13.

To positively prevent leakage, the ribs 32 define a cylindrical recess 36 in which a thin annular gasket 37 is fitted against an annular sealing lip 38 so that the gasket is sandwiched tightly against the wall 13 by the terminal head portion 21 with the lip 38 pressing into the gasket. This provides an effective fluid tight seal preventing electrolyte leakage through the opening 23.

Putting together the assemblies 11, 12 is quite straightforward. The gasket 37 slides easily over the body portion 22 of the terminal 15, and then the body portion is fitted through the side wall opening 23 with only slight rotation of the terminal being required to fit the lugs 34 within the locking notches 33. The ring 24 is slipped over the internally protruding body portion 22 and, with the parts clamped together, the terminal 15 is fused to the ring 24.

Once assembled, it can be readily seen that the terminal 15 is well protected against accidental damage from glancing or shearing blows since it is recessed within and shielded by the barrier ring 31. The ring itself is reinforced by the ribs 32 which, at the same time, provide the plurality of locking notches 33 that, in connection with the lugs 34, give the terminal 15 a very high resistance to torque loading. It will be readily apparent that such torque resistance is particularly important when electrical leads are connected to the battery 10 through the internal threads 16. The gasket 37 insures against electrolyte leakage without substantially increasing the proportions of the assembly.

Those familiar with this art will appreciate that the assemblies 11, 12 are well suited to economical high volume production and can be effectively manufactured even though there are some minor variations in part size, quality of surface finish and even the degree of care exercised in assembly. The latter result flows from the facts that torque resistance is provided from a large number of interfitting lugs and notches rather than a small number of precisely fitting parts, and leakage is resisted by the thin gasket 37, as opposed to some sort of precision fitting, with the parts being brought into tightly sealed relation by exercising simple squeezing pressure to sandwich the wall 13 between the terminal 15 and the locking ring 24.

We claim as our invention:

1. In a battery having a thin molded wall, a side terminal assembly passing through said wall comprising, in combination, a continuous barrier ring molded integrally with said wall to project outwardly therefrom and surround an opening through the wall, a plurality of ribs molded integrally with both said wall and said ring within the ring to both stiffen the ring and define, between said ribs, locking notches, a metal terminal having a body portion fitted within said opening and a head portion received within said ring and against said wall, said head portion being recessed within said ring, a plurality of lugs formed around the periphery of said head portion and received within said locking notches, and a metal ring joined with said terminal body portion on the inside of said wall, whereby said terminal is secured to said wall, shielded by said ring and locked by said notches against relative rotation to said wall.

2. The combination of claim 1 in which said ribs define a cylindrical recess, an annular sealing lip molded on said wall within said recess and a thin annular gasket fitted within said recess and against said wall and said lip, said head portion being sealed against said gasket.

3. The combination of claim 1 including an internally threaded nut member embedded in said head portion for receiving a threaded electrical connection.

* * * * *